United States Patent
Ishigami et al.

(10) Patent No.: US 7,152,564 B2
(45) Date of Patent: Dec. 26, 2006

(54) AIR INTAKE SYSTEM AND FORKLIFT EQUIPPED WITH IT

(75) Inventors: Akihiro Ishigami, Sagamihara (JP); Masafumi Abe, Sagamihara (JP); Toru Kamata, Yokohama (JP); Hiroto Katagiri, Yokohama (JP)

(73) Assignees: Mitsubishi Heavy Industries, Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/849,013

(22) Filed: May 20, 2004

(65) Prior Publication Data
US 2005/0022772 A1  Feb. 3, 2005

(30) Foreign Application Priority Data
May 30, 2003  (JP) .............................. 2003-154599

(51) Int. Cl.
F02M 35/10 (2006.01)
B60K 13/02 (2006.01)

(52) U.S. Cl. .......................... 123/184.53; 123/184.57; 181/229; 180/68.3

(58) Field of Classification Search ........... 123/184.21, 123/184.53, 184.57; 181/229; 180/68.3
See application file for complete search history.

(56) References Cited

U.S. PATENT DOCUMENTS

| | | | |
|---|---|---|---|
| 4,020,915 A | 5/1977 | Darnell et al. | |
| 4,378,945 A | 4/1983 | Trautman | |
| 5,424,494 A * | 6/1995 | Houle et al. | 181/229 |
| 5,572,966 A * | 11/1996 | Doddy et al. | 123/184.57 |
| 5,647,314 A * | 7/1997 | Matsumura et al. | 123/184.57 |
| 5,865,863 A | 2/1999 | DeSousa et al. | |
| 5,900,595 A | 5/1999 | Akima et al. | |
| 6,067,953 A | 5/2000 | Bloomer | |
| 6,098,586 A | 8/2000 | Bloomer | |
| 2001/0035096 A1 | 11/2001 | Stuart | |

FOREIGN PATENT DOCUMENTS

| | | |
|---|---|---|
| CN | 2276563 Y | 3/1998 |
| DE | 195 46 993 A1 | 7/1996 |
| EP | 0 896 148 A2 | 2/1999 |
| EP | 0 978 646 A2 | 2/2000 |
| JP | 54009317 A * | 1/1979 |
| JP | 08-135532 | 5/1996 |
| JP | 08177661 A * | 7/1996 |
| JP | 2000257521 A * | 9/2000 |
| JP | 2002061546 A * | 2/2002 |

* cited by examiner

*Primary Examiner*—Noah P. Kamen
(74) *Attorney, Agent, or Firm*—Wenderroth, Lind & Ponack, L.L.P.

(57) ABSTRACT

In an air intake system, a rear tower having an interior space is provided on the top surface of a body frame. A rear pillar having an interior passageway is mounted on the rear tower. An air intake port communicating with the passageway is provided in the rear pillar, and the passageway and the space within the rear tower are connected together. An expansion silencer is connected to the space of the rear tower and an air cleaner is connected to the expansion silencer. The top surface of a working oil tank is lower than the upper end of a side plate to form a space above the top surface, where the expansion silencer is provided. A base bracket is mounted to the air cleaner, a support bracket is mounted on the side plate, and the base bracket is mounted on the support bracket to support the air cleaner above the expansion silencer.

17 Claims, 12 Drawing Sheets

29 Rear Pillar
29a Passageway
29b Air Intake Port
29c Connection Port
40 Body Frame
41 Rear Tower
41a Connection Port
41b Space
41c Connection Port
42 Expansion Silencer
42a Connection Port
42b Space
42c Connection Port
43 Air Cleaner
43a Connection Port
43b Lower Portion (Mounting Portion) of Air Cleaner
43c Connection Port 45 Working Oil Tank
45a Top Surface
46 Side Plate
46a Upper End of Side Plate
48 Resonance Silencer
48a Expansion Chamber
48b Cylinder
48c Case
50 Bracket
50a Base Bracket
50b Support Bracket
51 Bolt
52 Duct 21 Forklift
22 Hoisting/Lowering Mast
24 Fork
25 Driver's Seat
26 Engine cover
27 Counterweight
28 Front pillar
29 Rear pillar
30 Head Guard
31 Driver's Cab
32 Steering Handle
33 Front Wheel
34 Rear Wheel 28 Front pillar
29 Rear pillar
29a passageway
29b Air Intake port
30 Head Guard
31 Driver's cab
40 Body Frame
41 Rear Tower
42 Expansion Silencer
43 Air Cleaner 45 Working Oil Tank
45a Top Surface
46 Side plate
46a Upper End of Side plate
48 Resonance Silencer
50 Bracket
50a Base Bracket
50b Support Bracket
51 Bolt
52 Duct

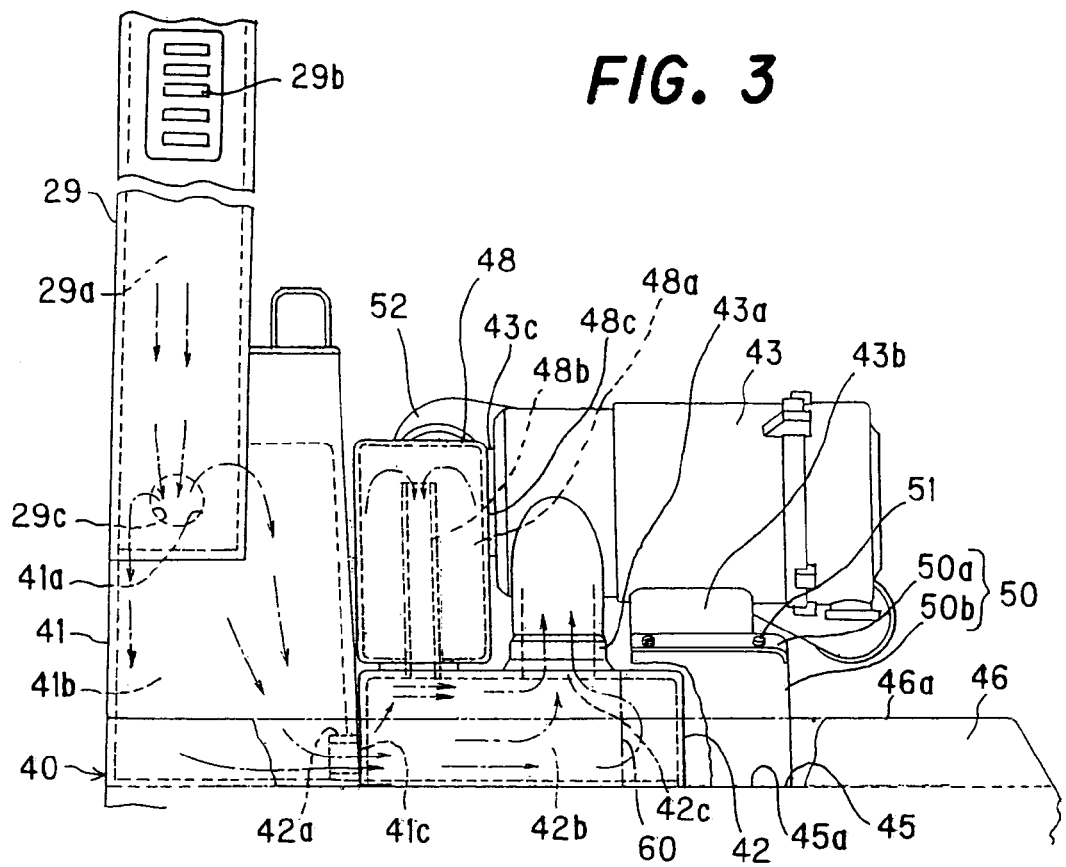

FIG. 3

29 Rear Pillar
29a Passageway
29b Air Intake Port
29c Connection Port
40 Body Frame
41 Rear Tower
41a Connection Port
41b Space
41c Connection Port
42 Expansion Silencer
42a Connection Port
42b Space
42c Connection Port
43 Air Cleaner
43a Connection Port
43b Lower Portion (Mounting Portion) of Air Cleaner
43c Connection Port 45 Working Oil Tank
45a Top Surface
46 Side Plate
46a Upper End of Side Plate
48 Resonance Silencer
48a Expansion Chamber
48b Cylinder
48c Case
50 Bracket
50a Base Bracket
50b Support Bracket
51 Bolt
52 Duct 29 Rear Pillar
41 Rear Tower
43 Air Cleaner
43a Connection Port
43b Lower Portion (Mounting Portion) of Air Cleaner
43c Connection Port
45 Working Oil Tank
45a Top Surface
46 Side Plate
46a Upper End of Side Plate
48 Resonance Silencer
50 Bracket
50a Base Bracket
50b Support Bracket
51 Bolt
52 Duct 29 Rear Pillar
41 Rear Tower
42 Expansion Silencer
43 Air Cleaner
43a Connection Port
43b Lower Portion (Mounting Portion) of Air Cleaner
45 Working Oil Tank
45a Top Surface 46 Side Plate
46a Upper End of Side Plate
48 Resonance Silencer
50 Bracket
50a Base Bracket
50b Support Bracket
51 Bolt
52 Duct 29 Rear Pillar
29a Passageway
29b Air Intake Port
29c Connection Port
41 Rear Tower
41a Connection Port
41b Space
41c Connection Port
43 Air Cleaner
46 Side Plate
52 Duct 42 Expansion Silencer
42b Space
42c Connection Port
42d Reinforcement Rib
43 Air Cleaner
43a Connection Port
43b Lower Portion (Mounting Portion) of Air Cleaner 43c Connection Port
48 Resonance Silencer
48b Cylinder
48c Case
49 Lid
50a Base Bracket
51 Bolt
52 Duct 29 Rear Pillar
41 Rear Tower
41c Connection Port
41d Rear Tower Base
42 Expansion Silencer
42b Space
42c Connection Port
43 Air Cleaner
43b Lower Portion (Mounting Portion) of Air Cleaner
43c Connection Port
45 Working Oil Tank
45a Top Surface 46 Side Plate
46a Upper End of Side Plate
48b Cylinder
49 Lid
50 Bracket
50a Base Bracket
50b Support Bracket
51 Bolt
52 Duct 41 Rear Tower
41c Connection Port
41d Rear Tower Base
42 Expansion Silencer
42b Space
42c Connection Port
45 Working Oil Tank
45a Top Surface
46 Side Plate
46a Upper End of Side Plate
48 Resonance Silencer
48b Cylinder
48c Case
50b Support Bracket 1 Air Intake System
2 Rear Pillar
3 Air Intake Port
4 Duct
5 Expansion Silencer
6 Duct
7 Air Cleaner
8 Duct 11 Air Intake System
12 Rear Pillar
13 Duct
14 Air Cleaner
15 Duct
16 Resonance Silencer

AIR INTAKE SYSTEM AND FORKLIFT EQUIPPED WITH IT

The entire disclosure of Japanese Patent Application No. 2003-154599 filed on May 30, 2003, including specification, claims, drawings and summary, is incorporated herein by reference in its entirety.

BACKGROUND OF THE INVENTION

1. Field of the Invention

This invention relates to an air intake system for supplying air to an engine of a forklift, and a forklift equipped with the air intake system. The air intake system is useful when applied in realizing a forklift in which the air intake system is in a compact configuration, and intake noise is markedly reduced.

2. Description of the Related Art

In an engine-powered forklift, whose vehicle runs by using an engine as a power source, such as a diesel engine or a gasoline engine, and which does cargo handling work by a hydraulic device, the engine is installed at the center of the vehicle. An air intake system for supplying air to the engine is disposed in a side portion of the vehicle.

FIG. 11 is an exploded perspective view showing an example of the configuration of a conventional air intake system (non-patent document 1; Toyota Forklift Parts Catalog 1999.01 Catalog No. 5G121-991, TOYOTA MOTOR CORP./TOYODA AUTOMATIC LOOM WORKS, LTD.). In an air intake system 1 of a forklift illustrated in this drawing, air is taken in through an air intake port 3 provided in an upper portion of a rear pillar 2, and flows downward through a passageway within the rear pillar 2. Then, the air flows through a hose-shaped duct 4, an expansion silencer 5, a hose-shaped duct 6, and an air cleaner 7 in this sequence. After purification by the air cleaner 7, the air is supplied to a combustion chamber of an engine (not shown) via a hose-shaped duct 8. Intake noise generated at this time is reduced by the expansion silencer 5.

FIG. 12 is an exploded perspective view showing another example of the configuration of a conventional air intake system (non-patent document 2; PARTS CATALOG NISSAN FORKLIFT MODEL D02 (S) SERIES MAY 2000 ISSUE Pub. No. CF-420-S). In an air intake system 11 of a forklift, illustrated in this drawing, air is taken in through an air intake port (not shown) provided in an upper portion of a rear pillar 12, and flows downward through a passageway within the rear pillar 12. Then, the air flows through a hose-shaped duct 13 and an air cleaner 14 in this sequence. After purification by the air cleaner 14, the air is supplied to a combustion chamber of an engine (not shown) via a hose-shaped duct 15. A resonance silencer 16 is also connected to the rear pillar 12.

With a forklift, it is desired to minimize the noise level at the ears of an operator who operates the forklift. The European CEN standards, for example, obligate vehicles to have a label attached thereto which explicitly describes the noise level (dB) at the ears of the operator. Intake noise generated by the air intake system contributes greatly to the above noise level.

Thus, it is important to decrease the intake noise. Upsizing a silencer or increasing the number or types of silencers for this purpose, however, results in upsizing of the air intake system if it has the configuration of the above-mentioned conventional air intake system 1 or 11.

In detail, the air intake system of FIG. 11 is configured to use the hose-shaped ducts 4 and 6, and does not effectively use the space below the air cleaner 7, thus making it difficult to achieve a compact configuration. Moreover, the air intake system has many seams, etc. The air intake system of FIG. 12 is also configured to use the hose-shaped duct 13, and does not allow effective use of the space below the air cleaner 14, thus posing difficulty in achieving a compact configuration.

SUMMARY OF THE INVENTION

The present invention has been accomplished in view of the above-described circumstances. Its object is to provide an air intake system capable of achieving an overall compact configuration and further decreasing intake noise, and a forklift equipped with the air intake system.

In a first aspect of the present invention for attaining the above object, there is provided an air intake system for supplying air to an engine of a forklift, comprising: a tower provided on a top surface of a body frame, the tower having an interior space; a pillar mounted on the tower, the pillar having an interior passageway; an air intake port provided in the pillar, the air intake port communicating with the passageway, the passageway and the space within the tower being connected together; an expansion silencer connected to the space of the tower; and an air cleaner connected to the expansion silencer.

According to this aspect, a hose-shaped duct as in the earlier technologies is unnecessary, the entire device can be rendered compact, and the number of components can be decreased.

In a second aspect of the invention, the air cleaner may be placed above the expansion silencer. According to this aspect, the space below the air cleaner can be used effectively, the space occupied by these members can be decreased, and the equipment can be installed in a limited space.

In a third aspect of the invention, a resonance silencer may be connected to the expansion silencer. According to this aspect, two types of silencers are used to attenuate the intake noise. Thus, noise reduction can take place over a broad frequency range.

In a fourth aspect of the invention, the space of the tower may be an expansion chamber. According to this aspect, the intake noise is attenuated by two expansion silencers. Thus, the noise reducing effect is enhanced.

In a fifth aspect of the invention, a resonance chamber may be provided within the expansion silencer. According to this aspect, the degree of freedom to combine the expansion silencer and the resonance silencer is raised. Thus, better noise reduction characteristics can be obtained.

In a sixth aspect of the invention, the expansion silencer may be made of resin. According to this aspect, the expansion silencer can become lightweight and its production is easy.

In a seventh aspect of the invention, a reinforcement rib may be formed on an outer peripheral surface of the expansion silencer. According to this aspect, the strength of the expansion silencer made of resin increases. This can also decrease noise escape due to vibrations of the outer peripheral surface of the silencer.

In an eighth aspect of the invention, a working oil tank may be provided in a side portion of the body frame, and a top surface of the working oil tank may be lower in height than an upper end of a side plate forming a side wall of the working oil tank. A space is thereby formed above the top surface of the working oil tank, and the expansion silencer may be provided in the space. According to this aspect, the space accommodating the expansion silencer can be increased, with the existing layout unchanged. An upsized expansion silencer having a better noise reducing effect can be installed.

In a ninth aspect of the invention, a base bracket may be mounted to an underside of the air cleaner, a support bracket may be mounted on an upper portion of the side plate, and the base bracket may be mounted on the support bracket, whereby the air cleaner is supported above the expansion silencer. According to this aspect, the air cleaner can be accommodated in an arrow space. Moreover, the operation for mounting the air cleaner may be an operation performed from the outside only, and thus is easy to perform.

The features of the first to ninth aspects may be combined arbitrarily.

In a tenth aspect of the invention, there is provided a forklift equipped with the air intake system according to any one of the first to ninth aspects. The forklift according to this aspect is a forklift in which the air intake system is compact in configuration and whose intake noise is markedly reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a side view showing the configuration of the air intake system;

DESCRIPTION OF THE PREFERRED EMBODIMENTS

An embodiment of the present invention will now be described in detail with reference to the accompanying drawings, which in no way limit the invention.

Figure 1:
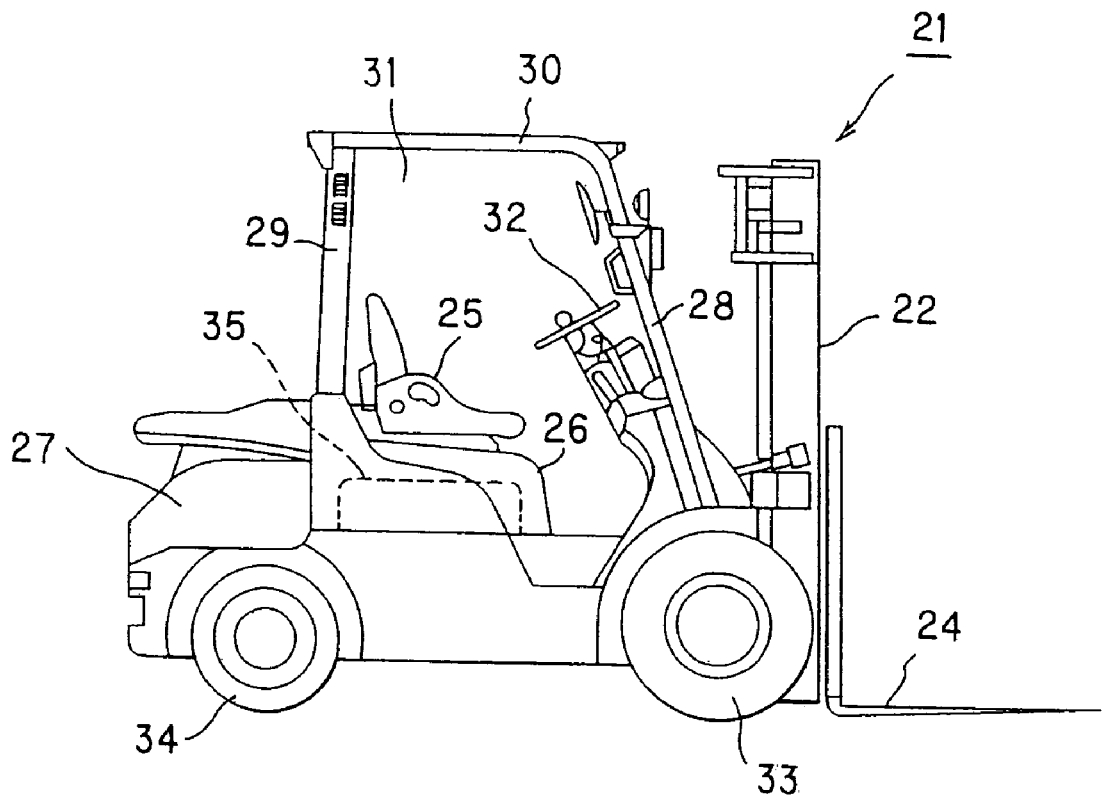
FIG. 1 is a general configuration drawing of a forklift equipped with an air intake system according to an embodiment of the present invention.
Figure 2:
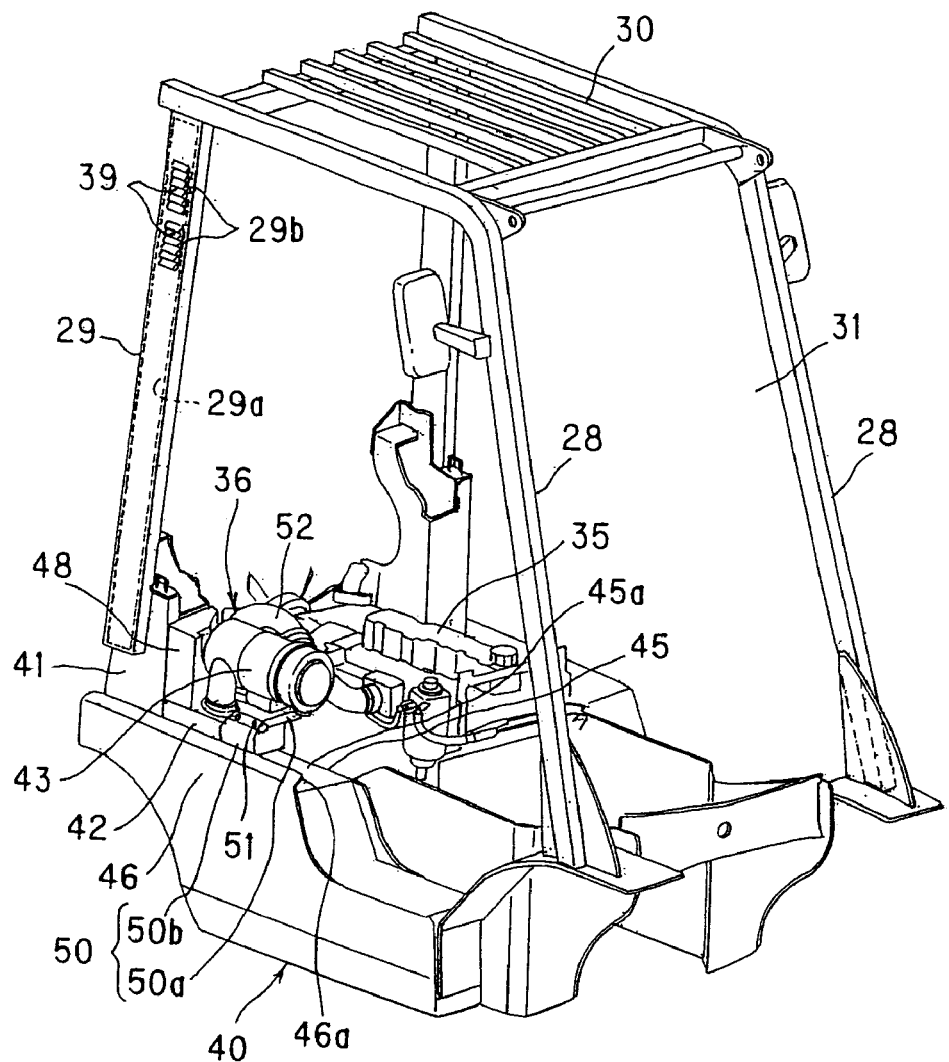
FIG. 2 is a perspective view showing the configuration of the air intake system and an engine portion.
Figure 4:
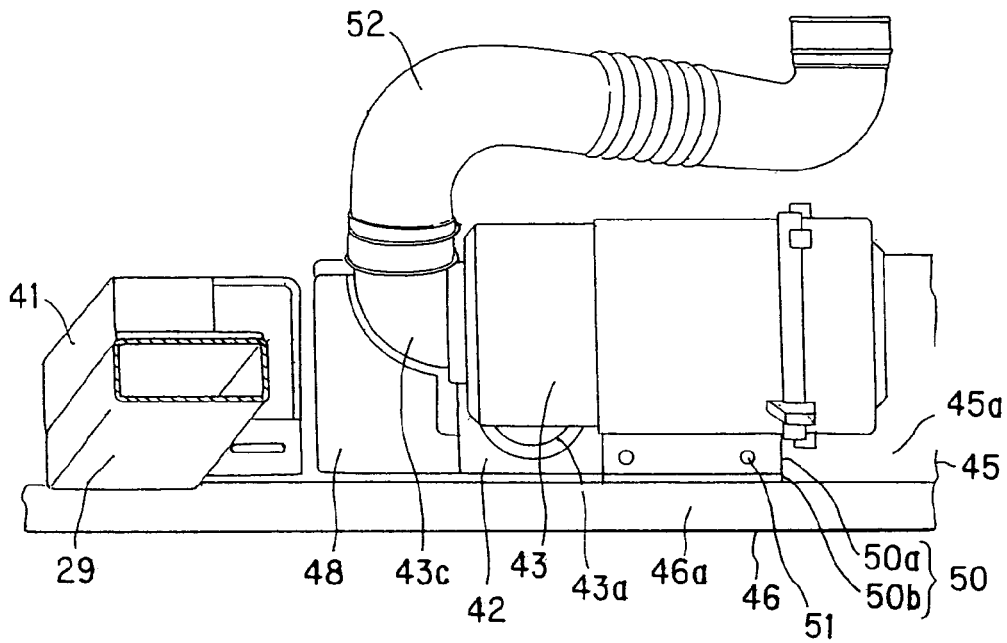
FIG. 4 is a plan view showing the configuration of the air intake system.
Figure 5A:
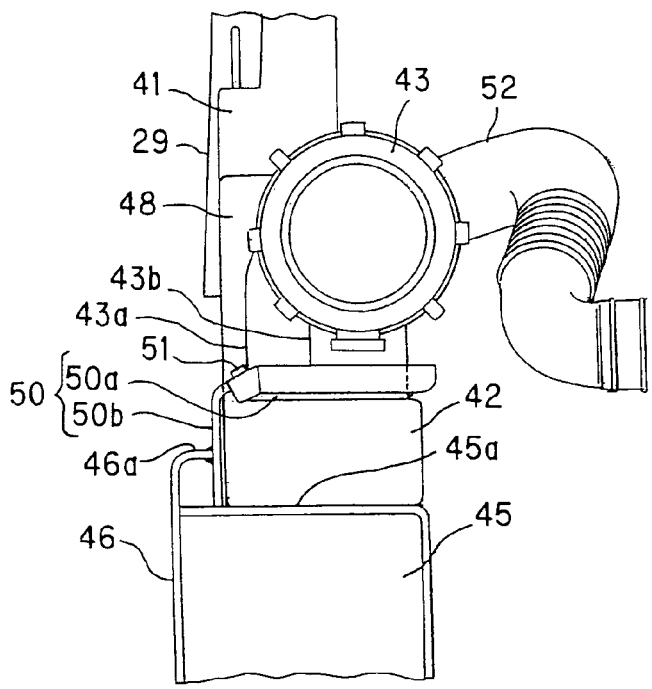
FIG. 5(a) is a front view showing the configuration of the air intake system.
Figure 5B:
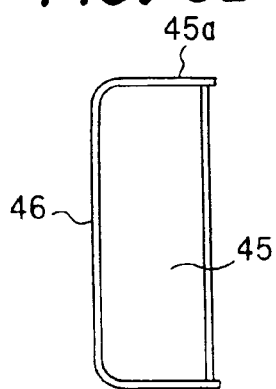
FIG. 5(b) is an explanation drawing showing a state before a top surface of a working fluid tank is lowered.
Figure 5C:
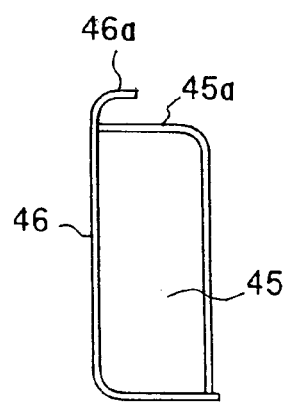
FIG. 5(c) is an explanation drawing showing a state after the top surface of the working fluid tank is lowered.
Figure 6:
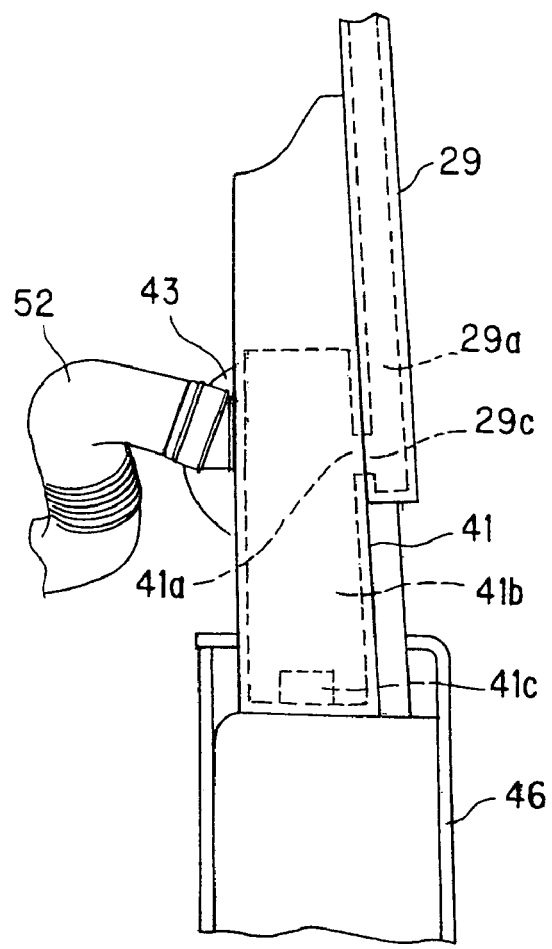
FIG. 6 is a rear view showing the configuration of the air intake system.
Figure 7:
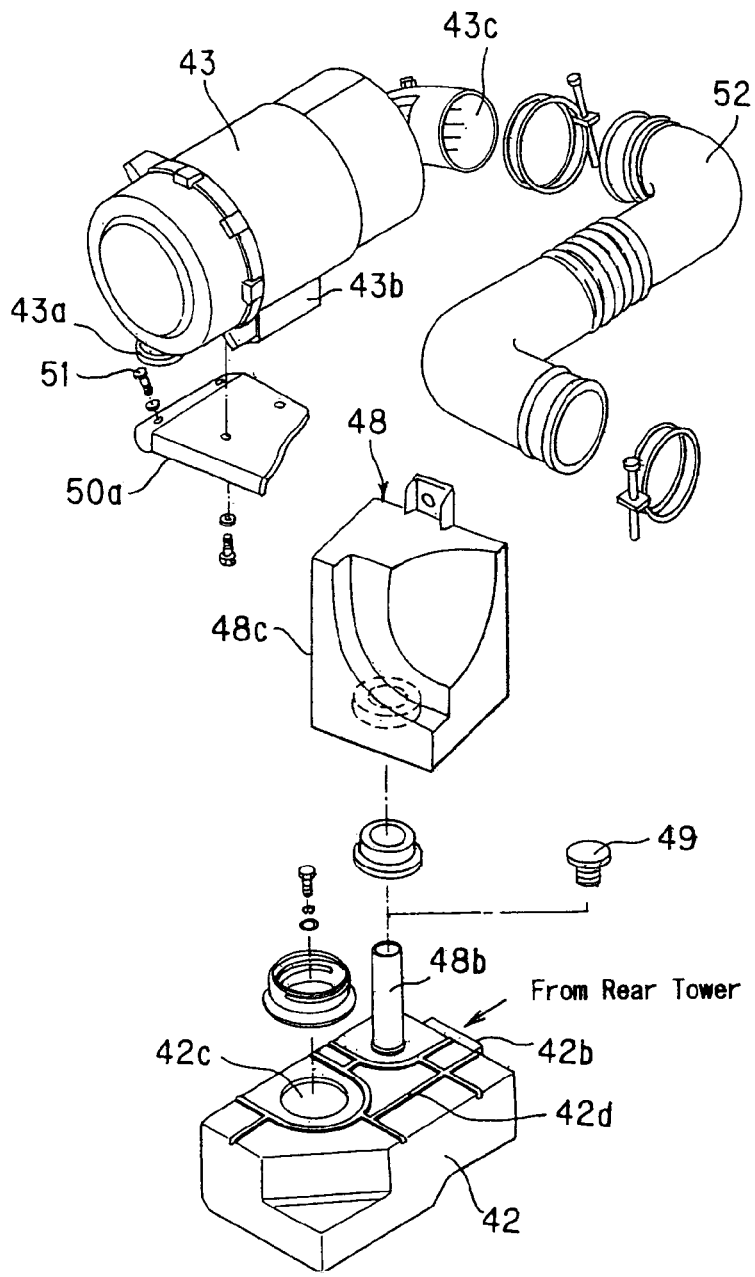
FIG. 7 is an exploded perspective view showing the configuration of the air intake system.
Figure 8:
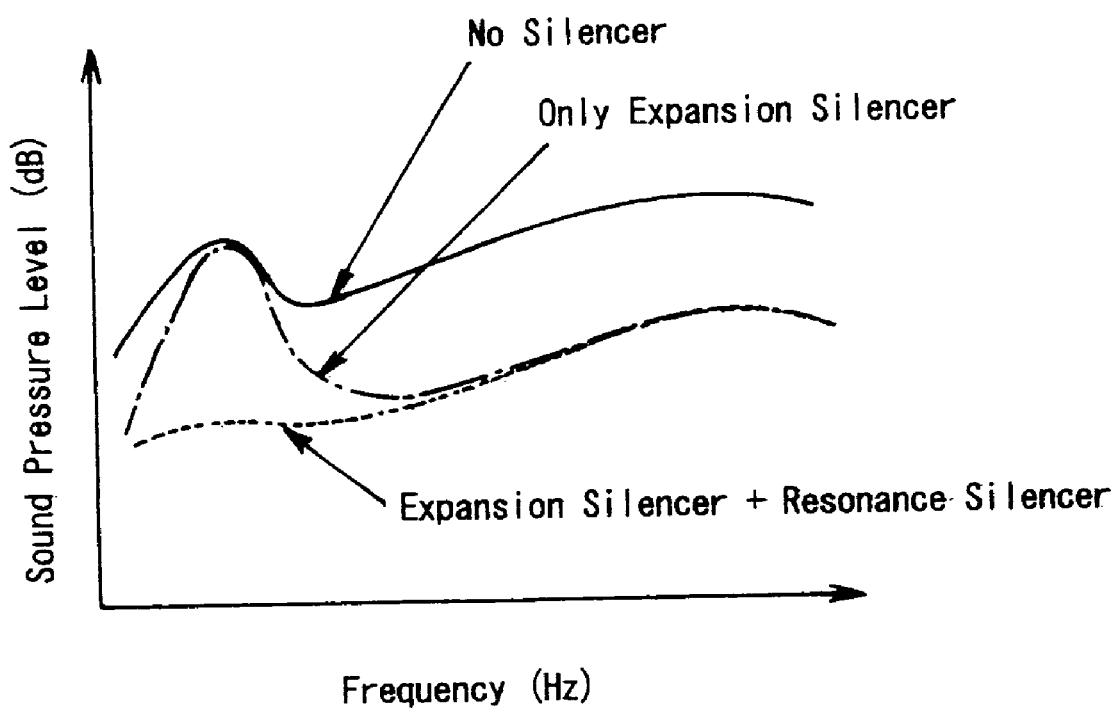
FIG. 8 is a drawing showing the intake noise reducing effect of a silencer or silencers of the air intake system.

FIG. 1 is a general configuration drawing of a forklift equipped with an air intake system according to an embodiment of the present invention. FIG. 2 is a perspective view showing the configuration of the air intake system and an engine portion. FIG. 3 is a side view showing the configuration of the air intake system. FIG. 4 is a plan view showing the configuration of the air intake system. FIG. 5(a) is a front view showing the configuration of the air intake system. FIG. 5(b) is an explanation drawing showing a state before a top surface of a working fluid tank is lowered. FIG. 5(c) is an explanation drawing showing a state after the top surface of the working fluid tank is lowered. FIG. 6 is a rear view showing the configuration of the air intake system. FIG. 7 is an exploded perspective view showing the configuration of the air intake system. FIG. 8 is an explanation drawing showing the intake noise reducing effect of a silencer or silencers of the air intake system.

Figure 9:
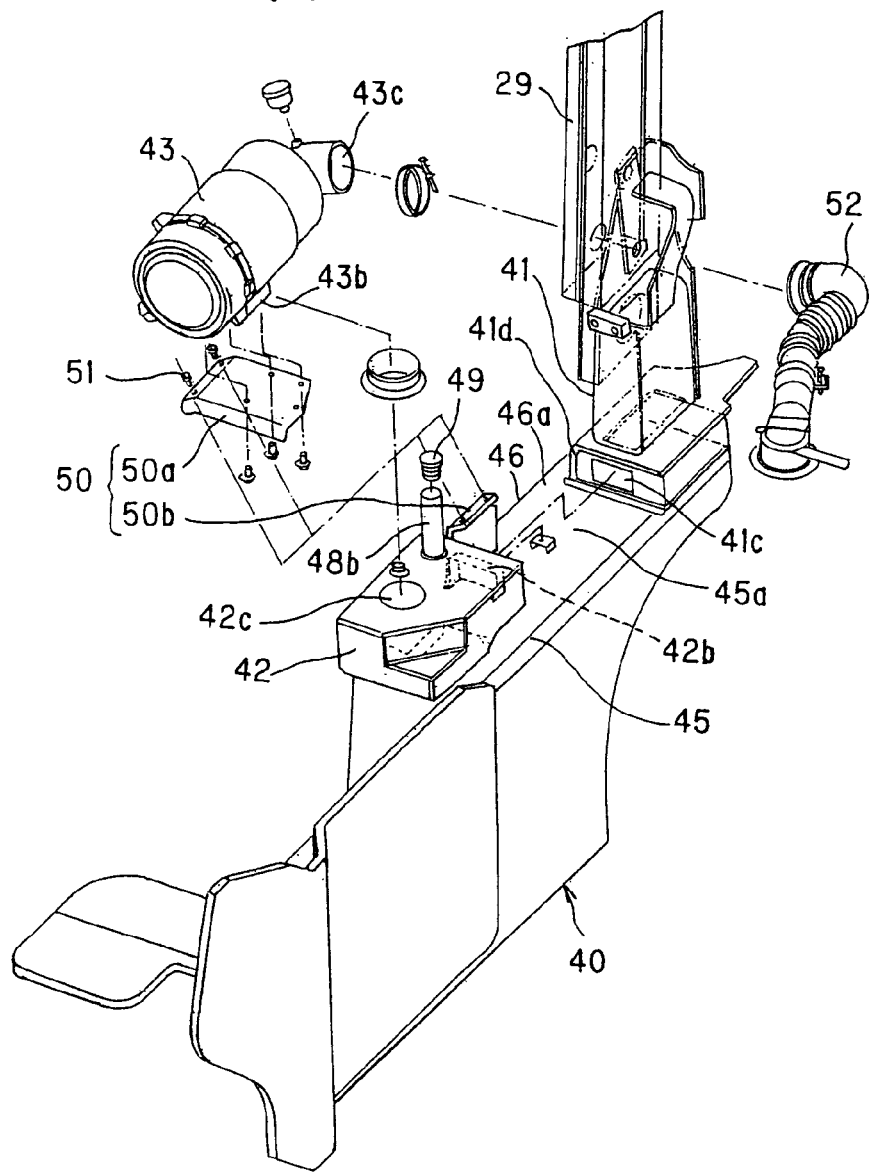
FIG. 9 is an exploded perspective view showing another configuration of the air intake system according to the embodiment of the present invention.
Figure 10:
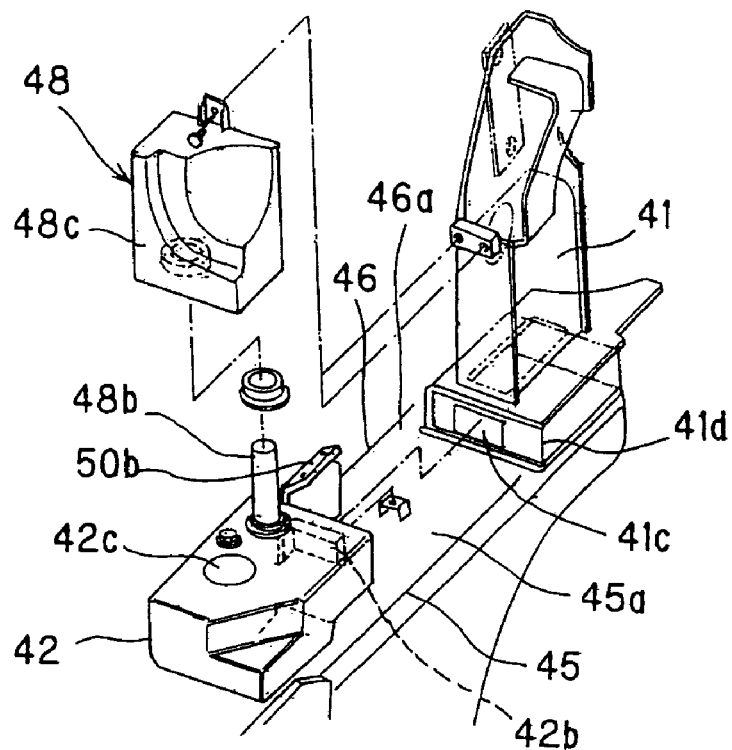
FIG. 10 is an exploded perspective view showing still another configuration of the air intake system according to the embodiment of the present invention.
Figure 11:
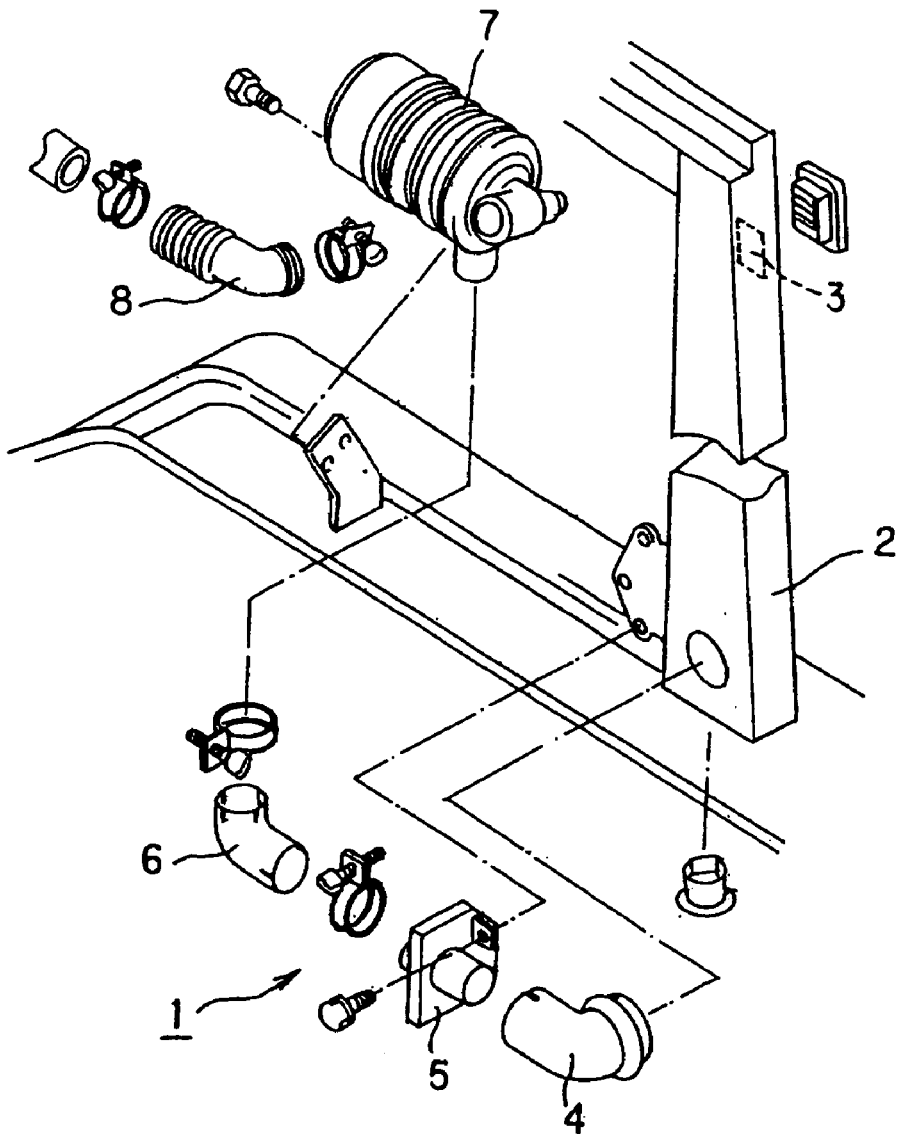
FIG. 11 is an exploded perspective view showing the configuration of a conventional air intake system.
Figure 12:
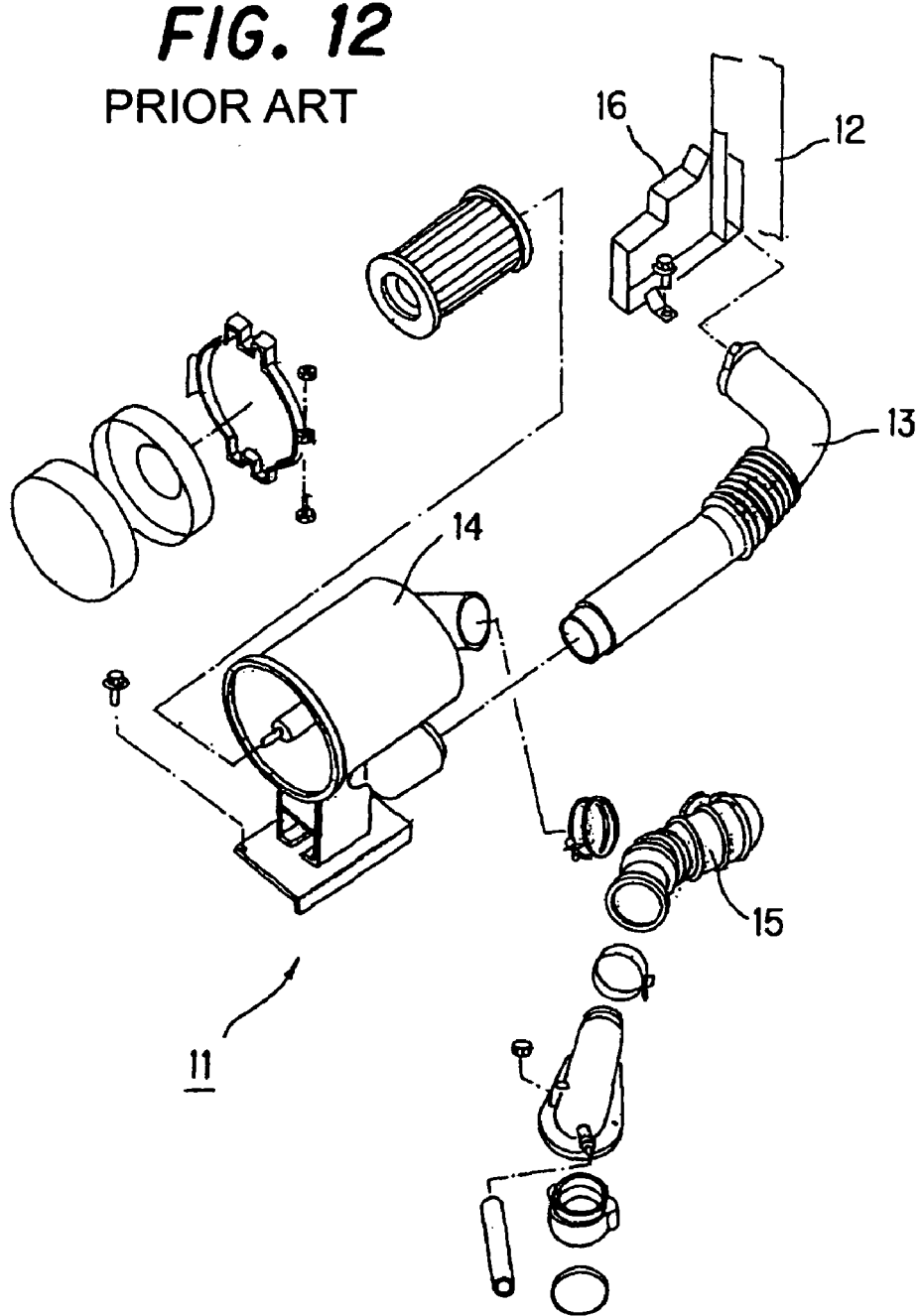
FIG. 12 is an exploded perspective view showing another configuration of a conventional air intake system.

FIG. 9 is an exploded perspective view showing another configuration of the air intake system according to the embodiment of the present invention. FIG. 10 is an exploded perspective view showing still another configuration of the air intake system according to the embodiment of the present invention.

As shown in FIG. 1, a forklift 21 has a hoisting/lowering mast 22 provided in a front portion of a vehicle, the hoisting/lowering mast 22 being expanded and contracted vertically by a hydraulic cylinder (not shown). A cargo placed on a fork 24 is raised or lowered, together with the fork 24, by the hoisting/lowering mast 22.

An engine 35, such as a diesel engine or a gasoline engine, is installed at the center of the vehicle. The engine 35 acts as a power source for performing, for example, travel of the vehicle (forklift) and cargo handling work by a hydraulic device such as the hydraulic cylinder. Normally, the engine 35 is covered with an engine cover 26. A driver's seat 25, where an operator sits, is attached to the top surface of the engine cover 26. A counterweight 27 for adjusting a weight balance between the front and rear portions of the vehicle is installed on the rear portion of the vehicle.

The driver's seat 25 is provided within a driver's cab 31 defined by a front pillar 28 provided ahead of the driver's seat 25, a rear pillar 29 provided behind the driver's seat 25, and a head guard 30 composed of these pillars 28 and 29 and a ceiling portion.

Various operating instruments and display instruments, such as a steering handle 32, and an operating lever (not shown) for operating the hoisting/lowering mast 22, are provided within the driver's cab 31. In the forklift 21, front wheels 33 are driving wheels rotationally driven by the engine 35, while rear wheels 34 are steering wheels steered by the operation of the steering handle 32 by the operator.

An air intake system (see FIG. 2) for supplying air to the engine 35 is disposed in a side portion of the vehicle (beside the engine). Normally, the air intake system is also covered with the engine cover 26.

The configuration of the air intake system will be described in detail by reference to FIGS. 2 to 7. FIG. 2 shows a state where the engine 35, air intake system 36, etc. are exposed, with a description of the engine cover 26 being omitted.

A rear tower 41 of a trapezoidal shape when viewed sideways is provided on the top surface of a body frame 40. The rear tower 41 also constitutes a part of the body frame 40, and the rear pillar 29 is attached to the side surface of the rear tower 41 by bolts or the like. A passage way 29a for air is present within the rear pillar 29, and an air intake port 29b (see FIG. 2) communicating with the passageway 29a is formed in an upper portion of the rear pillar 29. A louver 39 (see FIG. 2) is mounted on the air intake port 29b. The reason why the air intake port 29b is provided in the upper portion of the pillar 29 is that because of this layout, the position of the air intake port 29b is rendered high to take in as clean air as possible.

A connection port (air outlet) 29c communicating with the passageway 29a is formed in a side surface of a lower end portion of the rear pillar 29, and the lower end surface of the rear pillar 29 is closed. A connection port (air inlet) 41a is formed in a side surface of the rear tower 41 so as to align with the position of the connection port 29c of the rear pillar 29. The connection port 41a communicates with a space 41b defined within the rear tower 41. Hence, the passageway 29a of the rear pillar 29 and the space 41b of the rear tower 41 are connected with each other by attaching the lower end portion of the rear pillar 29 to the rear tower 41, with the connection ports 29c and 41a in alignment. The space 41b of the rear tower 41 is formed as an expansion chamber fully expanded in comparison with the passageway 29a of the rear pillar 29. Thus, the rear tower 41 functions not only as a body frame structure, but also as an expansion silencer.

An expansion silencer 42 is mounted on the front side of the rear tower 41. A connection port (air outlet) 41c communicating with the space (expansion chamber) 41b is formed in a side surface of the rear tower 41. In alignment with the position of the connection port 41c, a connection port (air inlet) 42a communicating with an expansion chamber 42b of the expansion silencer 42 protrudes on a rear surface of the expansion silencer 42. Thus, the expansion silencer 42 (expansion chamber 42b) is connected to the space 41b of the rear tower 41 by mounting the expansion silencer 42 to the rear tower 41 while inserting one of the connection ports, 42a, into the other connection port 41c (see FIG. 3). The expansion silencer 42 is made of resin, and reinforcement ribs 42d are formed on the outer peripheral surface of the expansion silencer 42.

An air cleaner 43 is connected to the expansion silencer 42. That is, the expansion silencer 42 functions not only as a silencer, but also as a duct for coupling the rear tower 41 and the air cleaner 43 together. Thus, a hose-shaped duct, as used in the earlier technologies, is not required.

The air cleaner 43 is placed above the expansion silencer 42. That is, the space below the air cleaner 43 is effectively used to accommodate the expansion silencer 42. A connection port (air outlet) 42c communicating with the expansion chamber 42b is provided in a top surface of the expansion silencer 42, while a connection port (air inlet) 43a of the air cleaner 43 is directed downward. By connecting these connection ports 42c and 43a, the expansion chamber 42b of the expansion silencer 42 is connected to the interior of the air cleaner 43.

A resonance silencer 48 is also connected to the expansion silencer 42. The resonance silencer 48 is fixed to the rear tower 41 by bolts or the like, is mounted on the top surface of the expansion silencer 42, and is located behind the air cleaner 43. The resonance silencer 48 is also made of resin. The resonance silencer 48 comprises a cylinder 48b (see FIGS. 3 and 7) formed on the top surface of the expansion silencer 42, and a case 48c mounted on the top surface of the expansion silencer 42 so as to cover the cylinder 48b. The cylinder 48b communicates with the expansion chamber 42b of the expansion silencer 42. The noise reducing characteristics of the resonance silencer 48 are determined by the length of the cylinder 48b, the volume of the interior of the case 48c (resonance chamber), and so on.

In the case of the forklift requiring no resonance silencer 48, an opening at the upper end of the cylinder 48b can be closed with a lid 49 (see FIG. 7), without mounting the case 48c. That is, the resonance silencer 48 is structured to be divided into the cylinder 48b formed with the expansion silencer 42 and the case 48c detachably mounted on the expansion silencer 42, whereby the resonance silencer 48 can be added where necessary.

In a side portion of the body frame 40, a working oil tank 45 is provided which comprises a body frame structure, such as a side plate 46, constituting the body frame 40. Working oil to be supplied to the hydraulic cylinder of the hoisting/lowering mast 22, etc. is stored within the working oil tank 45. As shown in FIG. 5(a), a top surface 45a of the working oil tank 45 is rendered lower than the upper end 46a of the side plate 46 forming the side wall of the working oil tank 45, whereby a space is formed above the top surface 45a of the working oil tank 45, and the expansion silencer 42 of a large size is provided in this space.

As shown in FIG. 5(b), a conventional structure has been such that the upper end 46a of the side plate 46 is the top surface 45a of the working oil tank 45. According to the present embodiment, on the other hand, the top surface 45a of the working oil tank is lowered relative to the upper end 46a of the side plate, whereby a space for disposing the expansion silencer 42 is secured above the top surface 45a, as shown in FIG. 5(c). In FIG. 3, an upper end portion of the side plate 46 is shown partially broken away, and the upper end position of the side plate 46 is the position of a double-dotted chain line. The volume of the working oil tank 45 is slightly decreased by lowering the top surface 45a of the working oil tank, but is still sufficient for storing a required amount of the working oil.

To place the air cleaner 43 above the expansion silencer 42, the air cleaner 43 is supported by a bracket 50 of an inverted-L-shape when viewed from the front, as shown in FIG. 5(a). The bracket 50 is separated at a bend into a base bracket 50a and a support bracket 50b.

The base bracket 50a is attached to a lower portion (mounting portion) 43b of the air cleaner 43 by bolts or the like, while the support bracket 50b is attached to an upper portion of the side plate 46 by welding or the like. An outer end portion of the base bracket 50a is attached to an upper end portion of the support bracket 50b by bolts 51 to support the air cleaner 43 above the expansion silencer 42. A hose-shaped duct 52 is connected to a connection port (air outlet) 43c of the air cleaner 43.

As shown by arrowed dashed-dotted lines in FIG. 3, air flows in the air intake system 36 of the above-described configuration as follows: Air is taken in through the air intake port 29b, and flows downward through the passageway 29a within the rear pillar 29. Then, the air flows through the space (expansion chamber) 41b of the rear tower 41, the expansion chamber 42b of the expansion silencer 42, and the air cleaner 43 in this sequence. The air is purified in the air cleaner 43, and is then supplied to a combustion chamber of the engine 35 via the duct 52. At this time, an intake noise is reduced by the rear tower 41 as an expansion silencer, the expansion silencer 42 and the resonance silencer 48.

A resonance chamber (resonance silencer) may be provided within the expansion silencer 42 as well. For example, the expansion silencer 42 may be divided at the position of a dashed-dotted line 60 so that one of the divisions (the rear division) will be used as an expansion chamber, and the other division (the front division) will be used as a resonance chamber (resonance silencer). The resonance silencer in this case may be configured to comprise a cylinder formed in the expansion silencer 42 (the portion on the expansion chamber side) and a case detachably mounted on the expansion silencer 42 (the portion on the expansion chamber side) so as to cover the cylinder, as in the case of the aforementioned resonance silencer 48.

The configuration of the air intake system 36 may be a configuration as shown in FIG. 9 or 10. In these drawings, the same parts as in the aforementioned air intake system 36 are assigned the same numerals as used therein. FIG. 9 shows a state where no resonance silencer 48 is provided, while FIG. 10 shows a state where the resonance silencer 48 is provided.

An air intake system 36 as shown in FIG. 9 or 10 has a rear tower base 41d of a rectangular parallelopipedal shape provided under a rear tower 41, and a connection port (air outlet) 41c is formed in a front surface of the rear tower base 41d. The connection port 41c and a connection port (air inlet) of an expansion silencer 42 are connected together, whereby the expansion silencer 42 (expansion chamber 42b) is connected to a space 41b of the rear tower 41. Other features are the same as in the aforementioned air intake system 36, so that their explanations are omitted hereinbelow.

In the air intake system 36 of the present embodiment, as described above, the rear tower 41 having the space 41b inside is provided on the top surface of the body frame 40, the rear pillar 29 having the passageway 29a inside is attached to the tower 41, the air intake port 29b communicating with the passageway 29a is provided in the pillar 29, the passageway 29a and the space 41b within the tower 41 are connected together, the expansion silencer 42 is connected to the space 41b of the tower 41, and the expansion silencer 42 is connected to the air cleaner 43. Thus, a hose-shaped duct as in the earlier technologies is unnecessary, the entire device can be rendered compact, and the number of components can be decreased.

The air cleaner 43 is placed above the expansion silencer 42. Thus, the space below the air cleaner 43 can be used effectively, the space occupied by these members can be decreased, and equipment can be installed in a limited space.

The resonance silencer 48 is connected to the expansion silencer 42, and these two types of silencers, 42 and 48, are used to attenuate the intake noise. Thus, noise reduction can take place over a broad frequency range. As illustrated in FIG. 8, if sound pressure level characteristics show a solid-line profile without a silencer, for example, the characteristics as indicated by a dashed-dotted line are obtained when there is only the expansion silencer 42 showing a noise reducing effect over a relatively broad frequency range, whereas the characteristics as indicated by a dotted line appear when the resonance silencer 48 showing a noise reducing effect over a relatively narrow frequency range is provided in addition to the expansion silencer, whereby noise reduction characteristics are improved.

Furthermore, the space 41b of the rear tower 41 serves as an expansion chamber, so that the intake noise is attenuated by the two expansion silencers. Thus, the noise reducing effect is enhanced.

If a resonance chamber is provided within the expansion silencer 42, the degree of freedom to combine the expansion silencer and the resonance silencer is raised. This is effective, for example, if there are a plurality of frequency ranges where the intake noise level peaks. Thus, better noise reduction characteristics can be obtained.

The expansion silencer 42 is made of resin. Thus, it can become lightweight and its production is easy.

The reinforcement ribs 42d are formed on the outer peripheral surface of the expansion silencer 42, so that the strength of the expansion silencer 42 made of resin increases. This can also decrease noise escape due to vibrations of the outer peripheral surface of the silencer.

The top surface 45a of the working oil tank 45 is rendered lower in height than the upper end 46a of the side plate 46 forming the side wall of the working oil tank 45 constituted in the side portion of the body frame 40. By this measure, the space is formed above the top surface 45a of the working oil tank, and the expansion silencer 42 is provided in this space. As a result, the space accommodating the expansion silencer can be increased, with the existing layout unchanged. An upsized expansion silencer 42 having a better noise reducing effect can be installed.

The base bracket 50a is mounted to the underside of the air cleaner 43, the support bracket 50b is mounted to the upper portion of the side plate 46, and the base bracket 50a is attached to the support bracket 50b to support the air cleaner 43 above the expansion silencer 42. Thus, the air cleaner 43 can be accommodated in a narrow space. Moreover, the operation for mounting the air cleaner 43 may be an operation performed from the outside, and thus is easy to perform.

In detail, if the base bracket 50a and the support bracket 50b are integral, it is necessary to mount the air cleaner 43 to the base bracket 50a which has been mounted on the side plate 46 together with the support bracket 50b. For this purpose, the air cleaner 43 has to be mounted, by bolts, from inside (below) the base bracket 50b. This mounting work is very difficult to do. According to the present embodiment, by contrast, the base bracket 50a and the support bracket 50b are separated from each other. Thus, the steps to take may be only to mount the base bracket 50a to the air cleaner 43, and then mount the base bracket 50a on the support bracket 50b. Thus, the combination of the base bracket 50a and the air cleaner 43 can be mounted on the support bracket 50b from the outside. This makes mounting work very easy.

The forklift 21 equipped with the above-described air intake system 36 of the engine 35 is a forklift in which the air intake system is compact in configuration and whose intake noise is markedly reduced.

While the present invention has been described by the above embodiment, it is to be understood that the invention is not limited thereby, but may be varied or modified in many other ways. Such variations or modifications are not to be regarded as a departure from the spirit and scope of the invention, and all such variations and modifications as would be obvious to one skilled in the art are intended to be included within the scope of the appended claims.

What is claimed is:

1. An air intake system for supplying air to an engine of a forklift, comprising:
   a tower provided on a top surface of a body frame, said tower having an interior space;
   a pillar mounted on said tower, said pillar having an interior passageway;
   an air intake port provided in said pillar, said air intake port communicating with said passageway, and said passageway and said interior space of said tower being connected together;
   an expansion silencer connected to said interior space of said tower; and
   an air cleaner connected to said expansion silencer;
   wherein a working oil tank is provided in a side portion of said body frame, a top surface of said working oil tank being lower in height than an upper end of a side plate forming a sidewall of said working oil tank, whereby a space is formed above said top surface of said working oil tank, and said expansion silencer is provided in said space.

2. The air intake system according to claim 1, wherein a base bracket is mounted to an underside of said air cleaner, a support bracket is mounted on an upper portion of said side plate, and said base bracket is mounted on said support bracket, whereby said air cleaner is supported above said expansion silencer.

3. A forklift equipped with the air intake system according to claim 2.

4. A forklift equipped with the air intake system according to claim 1.

5. An air intake system for supplying air to an engine of a forklift, comprising:
  a rear tower provided on a top surface of a body frame, said rear tower having an interior space;
  a rear pillar mounted on said rear tower, said rear pillar having an interior passageway;
  an air intake port provided in said rear pillar, said air intake port communicating with said passageway, and said passageway and said interior space of said rear tower being connected together;
  an expansion silencer connected to said interior space of said rear tower by an air inlet formed in a rear surface of said expansion silencer being directly connected to an air outlet formed in a front surface of said rear tower; and
  an air cleaner connected to said expansion silencer by an air outlet in a top surface of said expansion silencer being directly connected to a downwardly directed air inlet of said air cleaner, said air cleaner being placed directly above said expansion silencer.

6. The air intake system of claim 5, wherein a resonance silencer is connected to said expansion silencer, said resonance silencer comprising a cylinder formed in said expansion silencer and a case detachably mounted on said expansion silencer.

7. A forklift equipped with the air intake system according to claim 6.

8. The air intake system of claim 5, wherein said space of said rear tower is an expansion space.

9. A forklift equipped with the air intake system according to claim 8.

10. The air intake system of claim 5, wherein a resonance chamber is provided within said expansion silencer, a resonance silencer comprising said resonance chamber being divided to have a cylinder formed in said expansion silencer and a case that can be detachably mounted on said expansion silencer and replaced with a lid on an opening of said cylinder when said resonance silencer is not necessary.

11. A forklift equipped with the air intake system according to claim 10.

12. The air intake system of claim 5, wherein said expansion silencer is made of resin.

13. A forklift equipped with the air intake system according to claim 12.

14. The air intake system of claim 5, wherein a reinforcement rib is formed on an outer peripheral surface of said expansion silencer.

15. A forklift equipped with the air intake system according to claim 14.

16. A forklift equipped with the air intake system according to claim 5.

17. An air intake system for supplying air to an engine of a forklift, comprising:
  a tower provided on a top surface of a body frame, said tower having an interior space;
  a pillar mounted on a side of said tower, said pillar having an interior passageway;
  an air intake port provided in said pillar, said air intake port communicating with said passageway;
  a connection port provided at a lower end of said pillar communicating with a connection port of said tower to communicate said passageway with said interior space of said tower;
  an expansion silencer connected to said interior space of said tower; and
  an air cleaner connected to said expansion silencer;
  wherein said interior space of said tower has a greater cross sectional area than said passageway as seen on a cross section taken perpendicularly to a vertical axis.

* * * * *